(12) United States Patent
Balyon et al.

(10) Patent No.: US 9,239,173 B2
(45) Date of Patent: Jan. 19, 2016

(54) PHOTOVOLTAIC MODULE SUPPORT WITH INTERFACE STRIPS

(75) Inventors: Roger Balyon, San Jose (CA); Michael Meyers, San Jose, CA (US)

(73) Assignee: Apollo Precision (Fujian) Limited, Quanzhou (CN)

( * ) Notice: Subject to any disclaimer, the term of this patent is extended or adjusted under 35 U.S.C. 154(b) by 792 days.

(21) Appl. No.: 12/895,594

(22) Filed: Sep. 30, 2010

(65) Prior Publication Data

US 2012/0080077 A1    Apr. 5, 2012

(51) Int. Cl.
*H02S 20/23* (2014.01)
*F24J 2/52* (2006.01)
*H01L 31/042* (2014.01)

(52) U.S. Cl.
CPC .............. *F24J 2/5254* (2013.01); *F24J 2/5205* (2013.01); *F24J 2/5241* (2013.01); *F24J 2/5256* (2013.01); *H02S 20/00* (2013.01); *H02S 20/23* (2014.12); *Y02B 10/12* (2013.01); *Y02E 10/47* (2013.01); *Y10T 29/49355* (2015.01)

(58) Field of Classification Search
CPC  H01L 31/0422; H01L 31/0482; F24J 2/5241; F24J 2/5254; F24J 2/5256; F24J 2/5205; F24J 2/5258; H02S 20/00; H02S 20/23
USPC ................................ 136/243–251
See application file for complete search history.

(56) References Cited

U.S. PATENT DOCUMENTS

| | | | |
|---|---|---|---|
| 3,682,516 A | 8/1972 | Savage | |
| 4,832,001 A | 5/1989 | Baer | |
| 4,942,865 A | 7/1990 | Pierce-Bjorklund | |
| 5,043,024 A | 8/1991 | Cammerer et al. | |
| 5,125,608 A * | 6/1992 | McMaster et al. | 248/163.1 |
| 5,460,660 A | 10/1995 | Albright et al. | |
| 5,478,407 A | 12/1995 | Dorison et al. | |
| 5,505,788 A | 4/1996 | Dinwoodie | |
| 5,746,839 A | 5/1998 | Dinwoodie | |
| 6,082,060 A | 7/2000 | Bauer et al. | |
| 6,201,179 B1 | 3/2001 | Dalacu | |
| 6,672,018 B2 | 1/2004 | Shingleton | |
| 6,959,517 B2 | 11/2005 | Poddany et al. | |
| 8,209,919 B2 | 7/2012 | Beck | |
| 8,656,658 B2 | 2/2014 | Shufflebotham et al. | |
| 2002/0029799 A1 | 3/2002 | Yoda et al. | |
| 2003/0070368 A1* | 4/2003 | Shingleton | 52/173.3 |
| 2005/0178428 A1 | 8/2005 | Laaly et al. | |
| 2006/0213571 A1 | 9/2006 | Bean | |

(Continued)

FOREIGN PATENT DOCUMENTS

GB    2049158    12/1980
JP    06-085302    3/1994

OTHER PUBLICATIONS

International Search Report and Written Opinion mailed Apr. 24, 2012, for Application No. PCT US2011/053972.

(Continued)

*Primary Examiner* — Marla D McConnell
(74) *Attorney, Agent, or Firm* — Weaver Austin Villeneuve & Sampson LLP

(57) ABSTRACT

Apparatus and techniques for mounting frameless photovoltaic modules reduce module stress induced by the mounting configuration. Interface strips and strip/rail spacing configured to relieve module stress by reducing or eliminating module sag are used.

36 Claims, 12 Drawing Sheets

(56) References Cited

U.S. PATENT DOCUMENTS

| | | | |
|---|---|---|---|
| 2006/0243318 A1 | 11/2006 | Feldmeier et al. | |
| 2008/0041442 A1* | 2/2008 | Hanoka | 136/251 |
| 2008/0066801 A1 | 3/2008 | Schwarze | |
| 2008/0236567 A1 | 10/2008 | Hayden | |
| 2008/0236571 A1 | 10/2008 | Keshner et al. | |
| 2008/0244881 A1 | 10/2008 | Zante | |
| 2008/0302409 A1 | 12/2008 | Bressler et al. | |
| 2008/0308142 A1 | 12/2008 | Grip et al. | |
| 2008/0315061 A1 | 12/2008 | Fath et al. | |
| 2009/0114270 A1 | 5/2009 | Stancel | |
| 2009/0114271 A1* | 5/2009 | Stancel | 136/251 |
| 2009/0250580 A1 | 10/2009 | Strizki | |
| 2009/0302183 A1 | 12/2009 | Strizki | |
| 2010/0038507 A1 | 2/2010 | Schwarze et al. | |
| 2010/0059641 A1 | 3/2010 | Twesme et al. | |
| 2010/0108113 A1 | 5/2010 | Taggart et al. | |
| 2010/0132766 A1 | 6/2010 | Jenkins | |
| 2010/0219304 A1 | 9/2010 | Miros et al. | |
| 2010/0237028 A1 | 9/2010 | Cusson | |
| 2010/0269428 A1 | 10/2010 | Stancel et al. | |
| 2011/0197954 A1 | 8/2011 | Young et al. | |
| 2011/0265861 A1 | 11/2011 | Nabauer et al. | |
| 2012/0080074 A1 | 4/2012 | Hardikar et al. | |
| 2012/0080075 A1 | 4/2012 | Hardikar et al. | |
| 2012/0080076 A1 | 4/2012 | Hardikar et al. | |
| 2012/0097207 A1 | 4/2012 | Shufflebotham et al. | |
| 2012/0234378 A1 | 9/2012 | West et al. | |
| 2012/0260977 A1 | 10/2012 | Stancel | |

OTHER PUBLICATIONS

International Search Report and Written Opinion mailed May 17, 2012, for Application No. PCT US2011/056637.
U.S. Appl. No. 12/894,704, Office Action mailed Jan. 16, 2013.
U.S. Appl. No. 12/908,778, Office Action mailed Apr. 10, 2013.
UNIRAC Bright Thinking in Solar, latest press releases, "Unirac's solarmount-I chosen by arise solar for 200kW installation to power residentail apartment complex", Unirac revolutionizes residential PV mounting with introduction of solarmount-I, Unirac launches non-penetrating attachment for seamed metal roofs, "Spire corporation chooses Unirac and CLICKSYS to support 1.6MW solar project", "Rosendin electric, Inc. selects Unirac to support 1.15MW San Jose international airport solar project", May 4, 2010-Aug. 30, 2010, downloaded from http://www.unirac.com on Sep. 30, 2010.
Schletter Inc., "Module clamps overview" catalogue, www.schletter-inc.us, update 2009.
U.S. Appl. No. 12/894,704, "Photovoltaic module support with elastomer", Hardikar et al., filed Sep. 30, 2010.
U.S. Appl. No. 12/895,328, "Photovoltaic module support clamp assembly", Hardikar et al., filed Sep. 30, 2010.
U.S. Appl. No. 12/895,340, "Photovoltaic module support with cable clamps", Hardikar et al., filed Sep. 30, 2010.
U.S. Appl. No. 12/895,328, Office Action mailed Jun. 7, 2013.
U.S. Appl. No. 12/894,704, Office Action mailed Aug. 30, 2013.
U.S. Appl. No. 12/895,340, Office Action mailed Aug. 29, 2013.
U.S. Appl. No. 12/895,328, Office Action mailed Oct. 24, 2013.
Schierle, "Indeterminate beams," 2011, pp. 1-16.
U.S. Appl. No. 12/908,778, Notice of Allowance mailed Oct. 11, 2013.
U.S. Appl. No. 12/895,340, Office Action mailed Mar. 26, 2014.
U.S. Appl. No. 12/895,328, Office Action mailed Oct. 30, 2014.
U.S. Appl. No. 12/895,340, Office Action mailed Jan. 7, 2015.
U.S. Appl. No. 12/894,704, Office Action mailed Feb. 23, 2015.
U.S. Appl. No. 12/895,328, Notice of Allowance mailed Feb. 26, 2015.

* cited by examiner

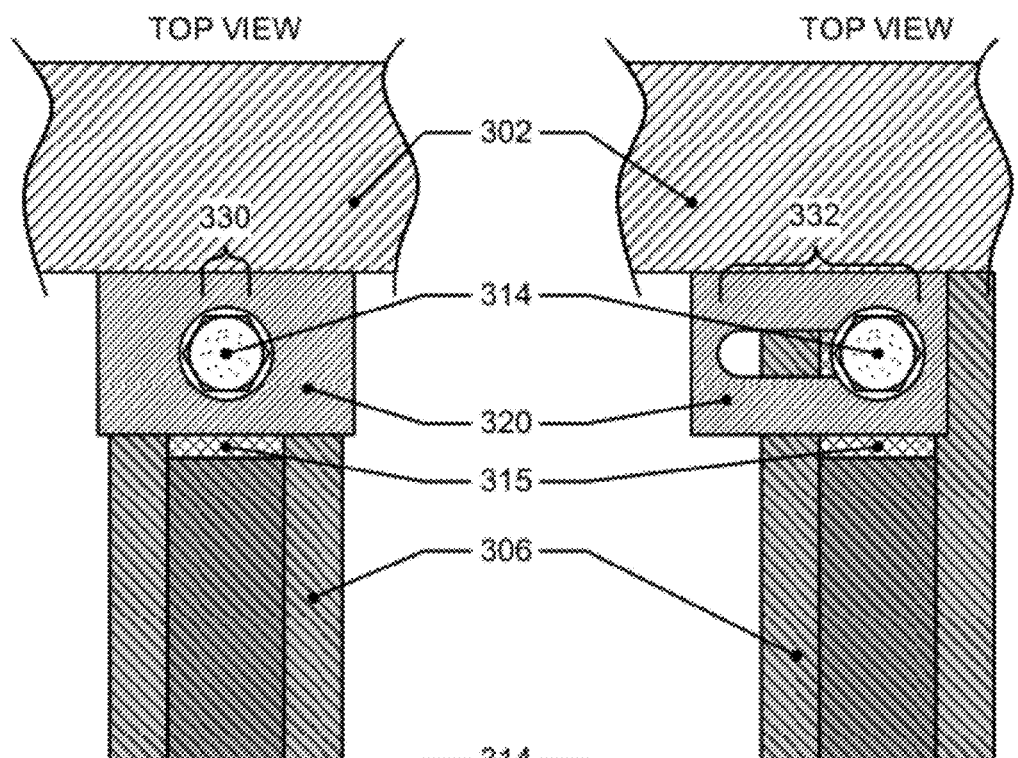
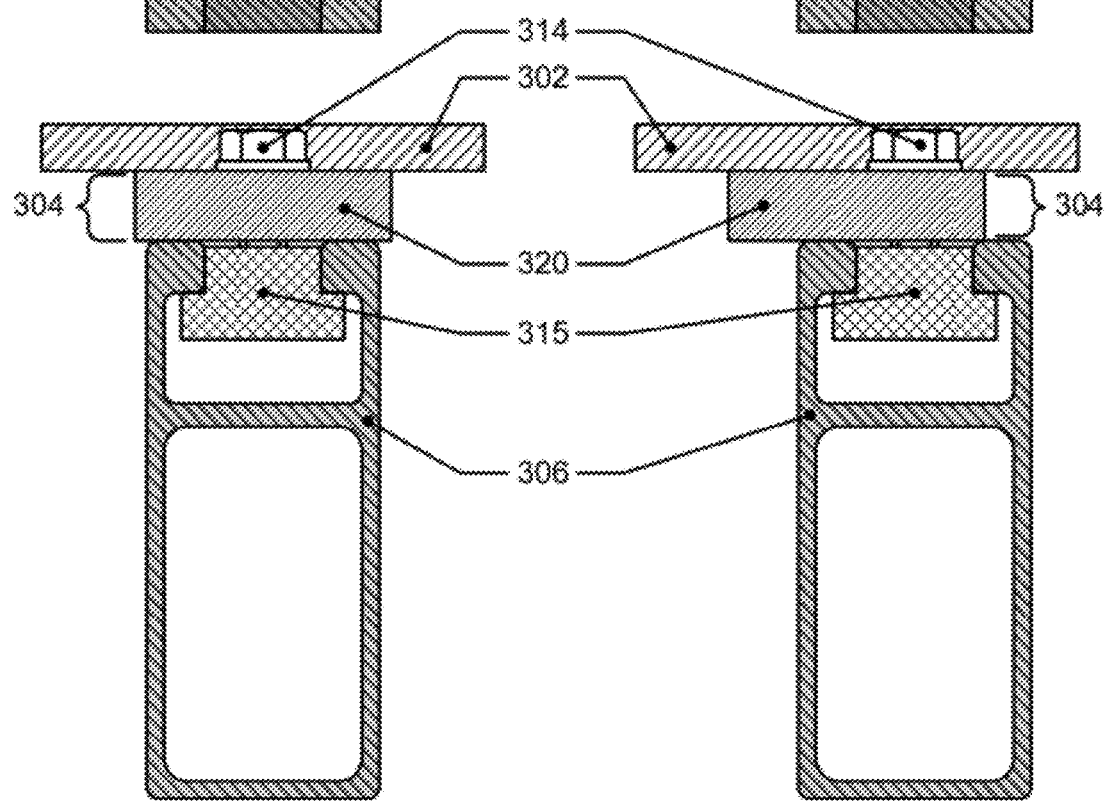
FIG. 3B     FIG. 3C

PHOTOVOLTAIC MODULE SUPPORT WITH INTERFACE STRIPS

BACKGROUND OF THE INVENTION

Photovoltaic cells are widely used for generation of electricity, with multiple photovoltaic cells interconnected in module assemblies. Such modules may in turn be arranged in arrays and integrated into building structures or otherwise assembled to convert solar energy into electricity by the photovoltaic effect. Arrays of modules are typically mounted on racking systems on the roofs of buildings or on ground-based structures. The modules are required to pass load testing to ensure that they can safely withstand snow loading and other environmental conditions. This can be challenging for frameless photovoltaic modules.

SUMMARY OF THE INVENTION

The invention relates generally to apparatus and techniques for mounting frameless photovoltaic modules to reduce module stress induced by the mounting configuration. The invention involves interface strips installed on photovoltaic modules and strip/rail spacing configured to relieve module stress by reducing or eliminating module sag.

In one aspect, the invention relates to a photovoltaic module assembly. The photovoltaic module assembly includes a frameless photovoltaic module having a frontside sheet and a backside sheet, and interface strips configured for attachment of the module to a mounting structure attached to the frameless photovoltaic module across the backside.

In another aspect, the invention relates to a method of making a frameless photovoltaic module assembly. The method involves providing a frameless photovoltaic module comprising a frontside sheet and a backside sheet, and attaching an interface strip to the backside sheet of the module, the interface strip configured for attachment of the module to a module mounting structure.

In another aspect, the invention relates to a photovoltaic assembly. The photovoltaic assembly includes a frameless photovoltaic module having a frontside sheet and a backside sheet, a mounting structure, and interface strips attached to the frameless photovoltaic module across the backside, wherein the frameless photovoltaic module is secured to the mounting structure via the interface strips.

Another aspect of the invention relates to a method of installing a frameless photovoltaic module having a frontside sheet and a backside sheet onto a mounting structure. The method involves providing the mounting structure and securing the frameless photovoltaic module onto the mounting structure with interface strips attached to the backside sheet of the frameless photovoltaic module.

These and other aspects of the invention are described further below with reference to the figures.

BRIEF DESCRIPTION OF THE DRAWINGS

FIGS. 3B-D are top and end views of a representative frameless photovoltaic modules and interface strips in accordance with embodiments of the present invention.

DETAILED DESCRIPTION

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known mechanical apparatuses and/or process operations have not been described in detail in order not to unnecessarily obscure the present invention.

Frameless Photovoltaic Modules

Photovoltaic modules are required to meet load ratings specified by IEC 61646 and UL 1703, incorporated herein by reference for this purpose. In this regard, a module must be able to pass a 2400 MPa static load test for wind and 5400 MPa static loading test for snow/ice. This load testing requirement can be particularly challenging for a frameless photovoltaic module (a module without a metallic frame around its perimeter) to meet. Further, the structural stability and module integrity can be difficult to preserve in a racking system for frameless photovoltaic modules.

Figure 1A:
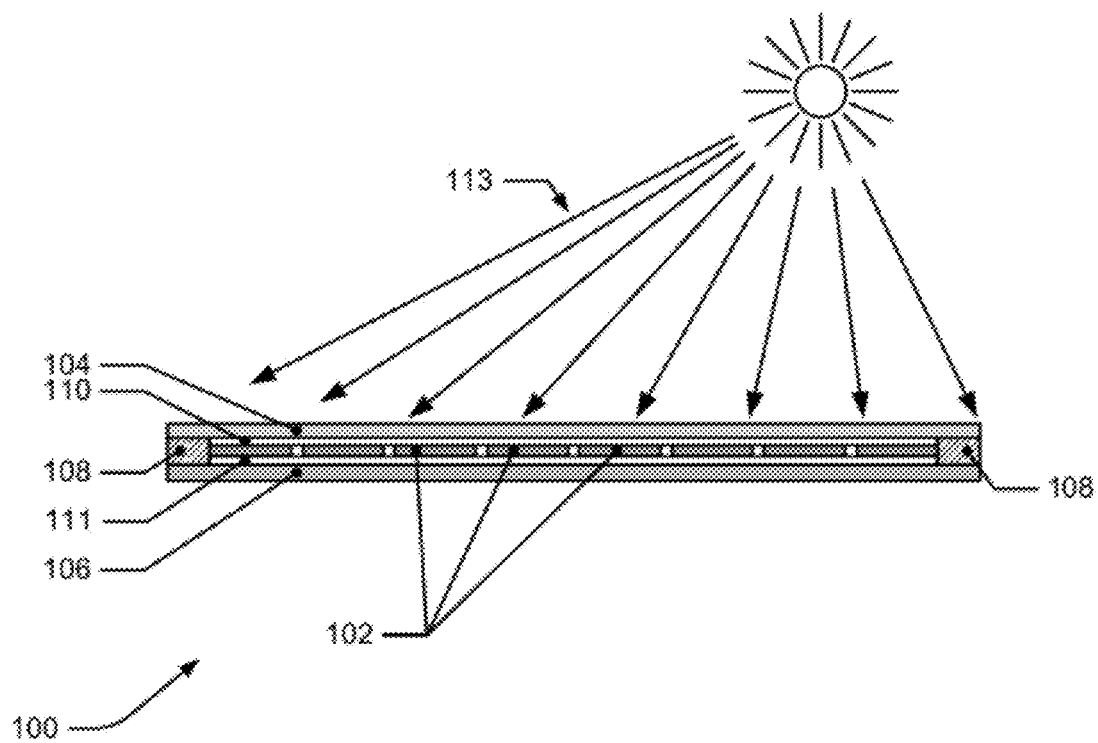
FIG. 1A shows a cross-sectional view of representative frameless photovoltaic module in accordance with the present invention.

Embodiments of the present invention relate to mounting of frameless photovoltaic modules (also referred to as solar modules or solar panels or, in this application, simply as modules), and associated racking systems and methods. FIG. 1A shows a not-to-scale cross-sectional view of certain components of a frameless solar module 100 in accordance with one embodiment of the present invention. The module 100 includes interconnected solar cells 102 and front (light-incident) and back layers 104 and 106, respectively, for environmental protection and mechanical support. A light-transmissive thermoplastic polymer encapsulant 110 is also provided between the solar cells 102 and the front layer 104 to provide electrical insulation and further protection to the underlying solar cells by preventing direct contact between the solar cells and the generally rigid front layer 104. The same or a different encapsulant layer 111 may also be provided between the solar cells 102 and the back layer 106 for the same reasons. In certain modules, an additional edge material 108 surrounds the solar cells 102, and in this example, is embedded within encapsulating layers 110 and 111.

The front and back layers may be any suitable material that provides the environmental protection and mechanical support required for reliable module operation. In some typical embodiments, the front and back layers are rigid plates, light transmitting in the case of the front layer, such as glass, although other materials, such as polymers, multi-layer laminates and metals that meet the functional requirements may also be used. In other embodiments the typical rigid back layer (e.g., back glass plate) can be replaced with a much lighter weight flexible material, thereby reducing handling costs associated with the module.

The front, light-incident layer 104 should transmit visible and near visible wavelengths of the solar spectrum 113 and be chemically and physically stable to anticipated environmental conditions, including solar radiation, temperature extremes, rain, snow, hail, dust, dirt and wind to provide protection for the module contents below. A glass plate comprising any suitable glass, including conventional and float glass, tempered or annealed glass, combinations thereof, or other glasses, is preferred in many embodiments. The total thickness of a suitable glass or multi-layer glass layer 104 may be in the range of about 2 mm to about 15 mm, optionally from about 2.5 mm to about 10 mm, for example about 3 mm or 4 mm. As noted above, it should be understood that in some embodiments, the front layer 104 may be made of a non-glass material that has the appropriate light transmission, stability and protective functional requirements. The front layer 104, whether glass or non-glass, transmits light in a spectral range from about 400 nm to about 1100 nm. The front layer 104 may not necessarily, and very often will not, transmit all incident light or all incident wavelengths in that spectral range equally. For example, a suitable front layer is a glass plate having greater than 50% transmission, or even greater than 80% or 90% transmission from about 400-1100 nm. In some embodiments, the front layer 104 may have surface treatments such as but not limited to filters, anti-reflective layers, surface roughness, protective layers, moisture barriers, or the like. Although not so limited, in particular embodiments the front layer 104 is a tempered glass plate about 3 mm thick.

The back layer 106 may be the same as or different than the front layer 104 and is also typically a glass plate as described above. However, since the back layer 106 does not have the same optical constraints as the front layer 104, it may also be composed of materials that are not optimized for light transmission, for example metals and/or polymers. And, while the present invention is applicable in more typical module configurations having both front and back glass plate layers, the invention finds particularly advantageous application in embodiments in which the back layer 104 is a lighter weight flexible material. Such lighter weight modules have manufacturing and transportation benefits, but can present additional challenges for module stability, including compliance with load testing requirements stresses induced by module mounting configurations. In such embodiments, the back layer 106 may be a flexible yet weatherable laminate that protects the photovoltaic cells and other module components from moisture, UV exposure, extreme temperatures, etc. The back layer laminate may include a weatherable back sheet exposed to the exterior of the module. The back sheet should be resistant to environmental conditions expected to be experienced by the module (e.g., temperatures of about −40 to 90° C.), so that it is stable throughout the range of temperate climate temperatures and conditions so as to retain its properties to perform its protective function.

The back sheet may be composed of a fluoropolymer, including but not limited to polyvinyl fluoride (PVF) (e.g., Tedlar® film available from DuPont), polyvinylidene fluoride (PVDF), ethylene-tetrafluoroethylene (ETFE), fluorinated ethylene-propylene (FEP), perfluoroalkoxy (PFA) and polychlorotrifluoroethane (PCTFE). Other weatherable materials may be used in addition to or instead of a fluoropolymer, including silicone polyesters, chlorine-containing materials such as polyvinyl chloride (PVC), plastisols, polyethylene terephthalate (PET), polypropylene, polybutylene, polybutylene terephthalate, and acrylics or combinations (laminated stacks) of the above. In certain embodiments, any material that meets UL 1703 requirements (incorporated by reference herein) can be used. In one example, the back layer includes PVF (e.g., Tedlar®). In certain examples, the thickness may range from about 2 to about 12 mils, although other thicknesses may be used as appropriate. A suitable flexible back layer laminate may also include a flexible moisture barrier sandwiched between an insulation sheet, for example a sheet of PET, and the weatherable back sheet. A suitable moisture barrier may be a metallic sheet, such as an aluminum foil. A suitable laminate back sheet in accordance with some embodiments of the invention is composed of a polyvinyl fluoride/Al foil/polyethylene terephthalate laminate (e.g., Tedlar®/Al foil/PET). Further description of suitable flexible back layers for photovoltaic cells that may be used in modules in accordance with the present invention is provided in U.S. Published Patent Application No. 2008/0289682 and U.S. Published Patent Application No. 2010-0071756, each of which is incorporated by reference herein for this purpose.

The edge material 108 may be an organic or inorganic material that has a low inherent water vapor transmission rate (WVTR) (typically less than 1-2 $g/m^2/day$) and, in certain embodiments may absorb moisture and/or prevent its incursion. In one example, a butyl-rubber containing a moisture getter or desiccant is used.

The solar cells 102 may be any type of photovoltaic cell including crystalline and thin film cells such as, but not limited to, semiconductor-based solar cells including microcrystalline or amorphous silicon, cadmium telluride, copper indium gallium selenide or copper indium selenide, dye-sensitized solar cells, and organic polymer solar cells. In particular embodiments, the cells are copper indium gallium selenide (CIGS) cells. In other aspects of the invention, the cells can be deposited as thin films on the front, light-incident (e.g., glass) layer 104. Direct deposition of a solar cell on glass is described, for example, in U.S. Published Patent Application No. 2009/0272437, incorporated by reference herein for this purpose. In such an embodiment, element 110 of FIG. 1A would be absent and element 102 would be in contact with the front, light-incident layer 104.

Figure 1B:
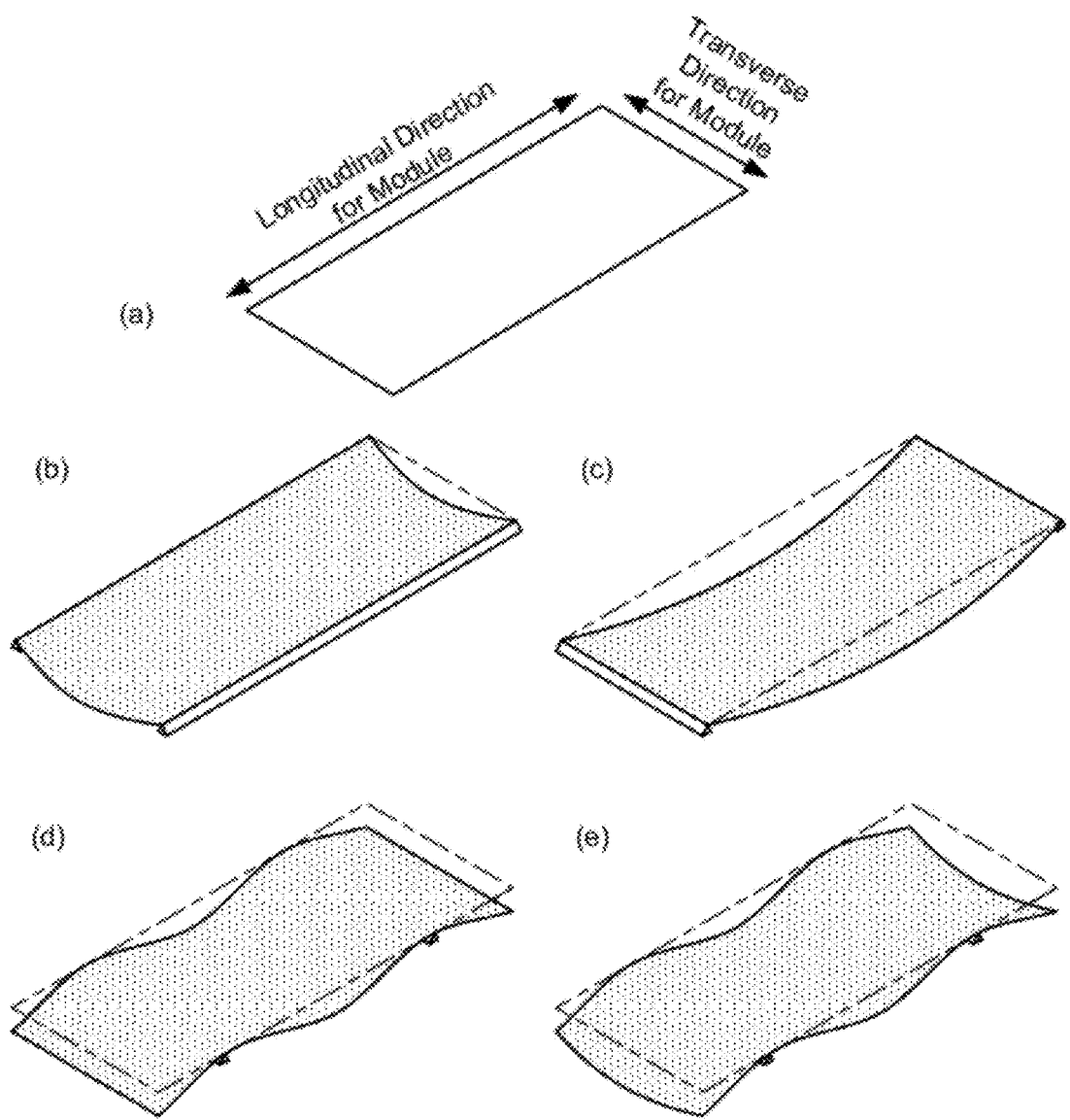
FIG. 1B illustrates orientation conventions referenced in this document with respect to a representative frameless photovoltaic module in accordance with the present invention.

Frameless photovoltaic modules are often rectangular in overall shape, as shown in FIG. 1B. For purposes of discussion, references to frameless photovoltaic modules herein will be made in the context of a rectangular module possessing a longitudinal axis or direction and a transverse axis or direction (as depicted in FIG. 1B, diagram (a)), wherein the longitudinal axis is along the major (larger) dimension of the rectangle and the transverse axis is along the minor (smaller) dimension of the rectangle. Similarly, reference may be made to the length and width of the module. The length of a module refers to the major dimension of the rectangle; the width of a module refers to the minor dimension of the rectangle. Of course, frameless photovoltaic modules may take on a variety of forms departing from a rectangle, and reference to rectangular modules, rectangles, and longitudinal or transverse axes, dimensions, or directions, should not be viewed as limiting the invention only to rectangular modules.

Reference is also made in this application to sagging of a frameless photovoltaic module. In some cases, a module will be described as experiencing sagging along a transverse or longitudinal direction. Sag along a transverse direction refers to sagging behavior which manifests as a non-linear displacement of the module from a line running in a transverse direction, as depicted in FIG. 1A, diagram (b). Sag along a longitudinal direction refers to sagging behavior which manifests as a non-linear displacement of the module from a line running in a longitudinal direction, as depicted in FIG. 1A, diagram (c). A module may sag at multiple points depending on the method of support, as depicted in FIG. 1A, diagram (d). Sag may occur along both transverse and longitudinal directions to different degrees at the same time and result in complex overall displacement, as depicted in FIG. 1A, diagram (e).

Frameless Photovoltaic Module Mounting Rail Systems

Figure 2A:
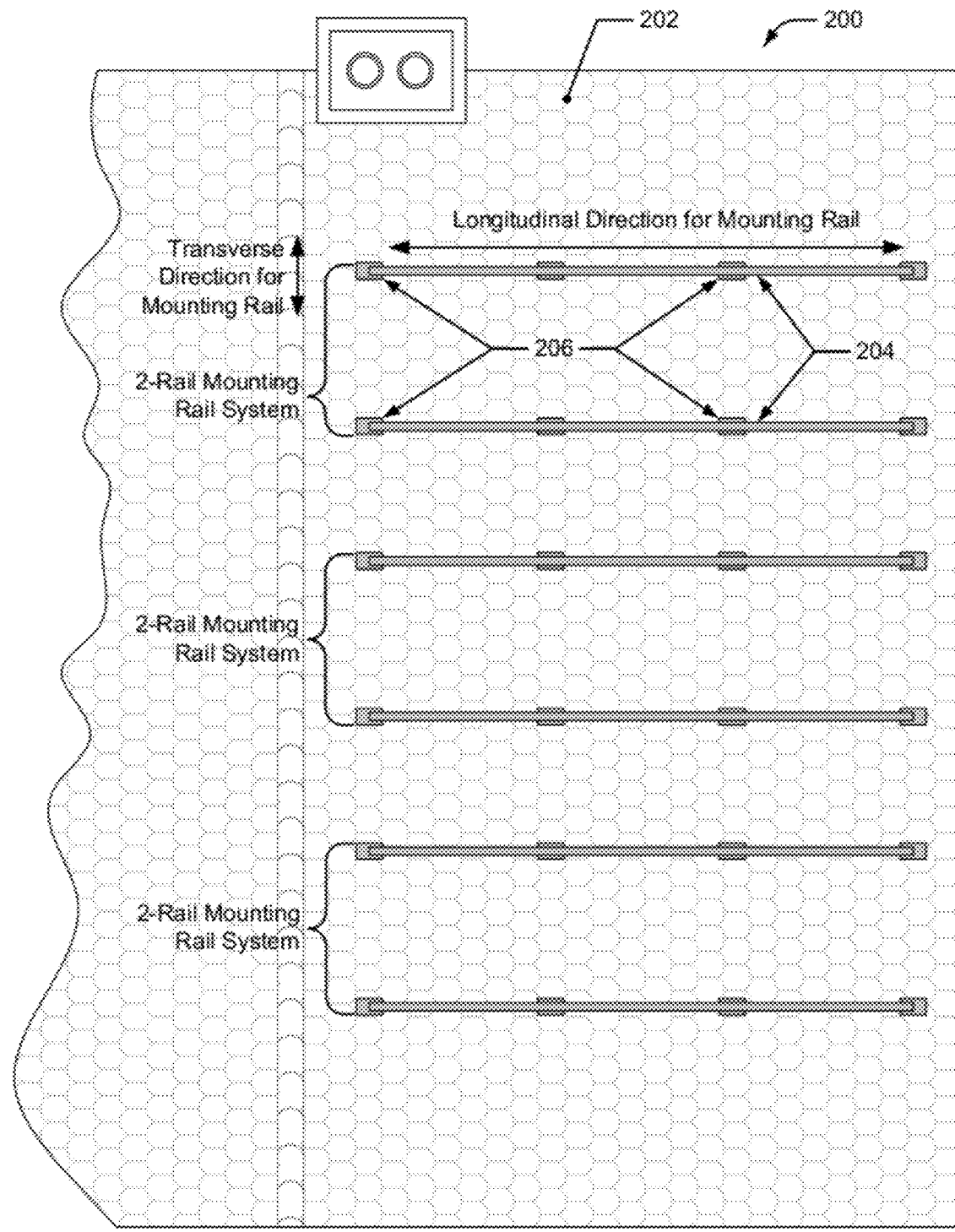
FIG. 2A depicts a partial plan view of an example frameless photovoltaic module mounting rail installation on a household roof.
Figure 2B:
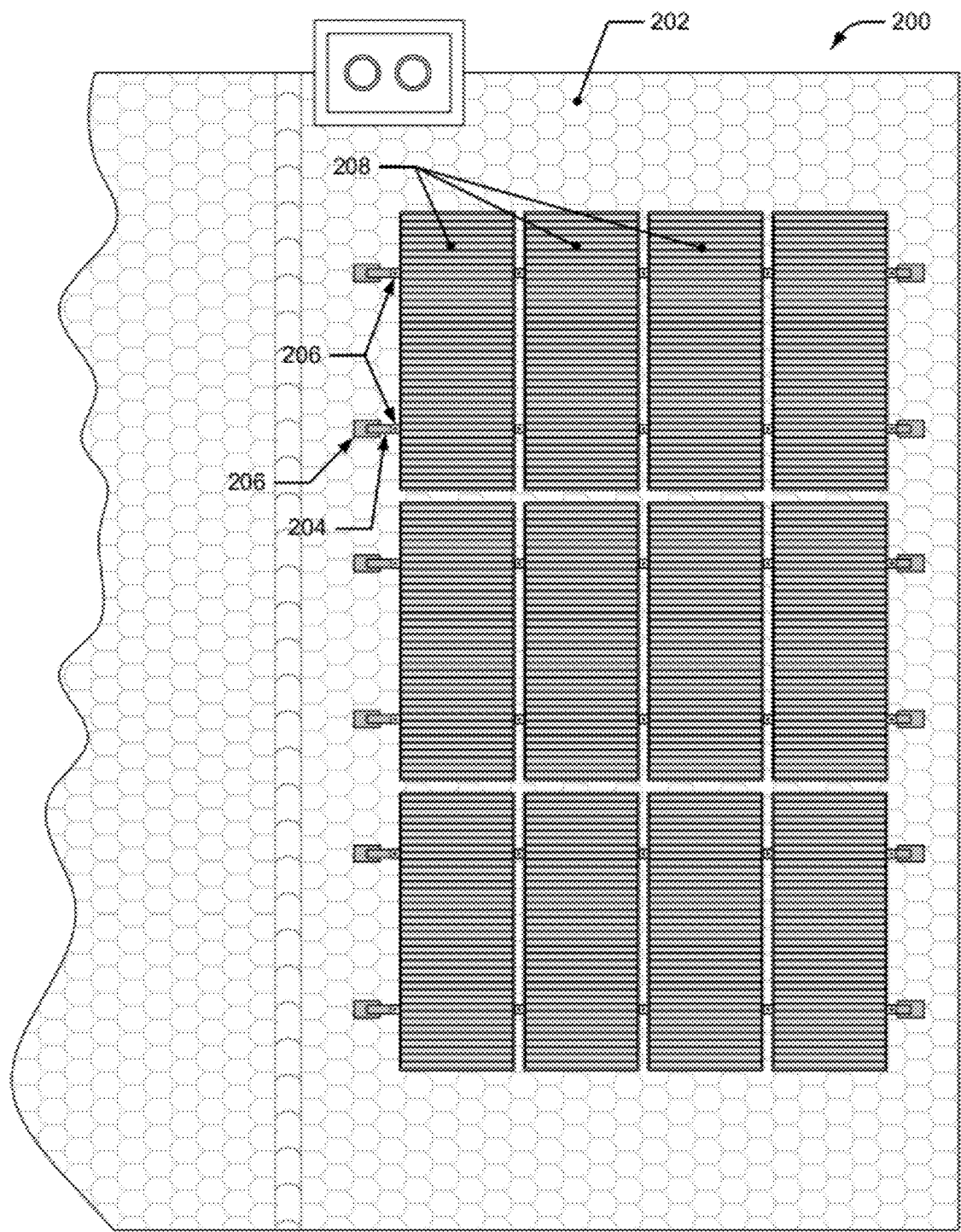
FIG. 2B depicts a partial plan view of an example frameless photovoltaic module mounting rail installation on a household roof with frameless photovoltaic modules installed.

Frameless photovoltaic modules are often mounted onto racking or mounting rail systems when installed at their installation locations. A plan view of an example mounting rail system is shown in FIGS. 2A and 2B. Such mounting rail systems 200 are frequently attached to freestanding support structures, roofs 202, carports, walls, or other structures which receive exposure to sunlight and can support the weight of the mounting rails 204 and installed frameless photovoltaic modules 208. Alternatively, mounting rails may be deployed on freestanding ground-based structures. All such structures are often oriented, or may be re-oriented, to present the mounted frameless photovoltaic modules 208 in an orientation that promotes efficient solar power generation.

In one embodiment, the mounting rail system includes two or more rails 204 which support one or more frameless photovoltaic modules 208. The mounting rails 204 may be substantially longer than the mounting rails 204 are wide or deep. For example, a mounting rail 204 may have overall dimensions of 2" wide by 3" deep, but be 144" long. Several sections of mounting rail 204 may also be connected end-to-end or be butted up to one another to form a much longer mounting rail. The mounting rails 204 may be mounted to a structure, such as roof 202, either directly or using standoffs 206. The mounting rails 204 may also be attached to a supplemental support structure; the supplemental support structure may elevate the rails or position the mounting rails 204 in a more optimum manner (e.g., position the mounting rails 204 such that attached frameless photovoltaic modules 208 will be oriented towards the sun to a greater extent).

The mounting rails 204 may be manufactured from extruded or rolled materials, such as aluminum or steel, or from other materials or using other manufacturing techniques. The mounting rails 204 may be hollow, solid, or filled with material, such as foam or honeycomb. The mounting rails 204 may include grooves, holes, t-slots, or other features which allow for hardware to be attached to the mounting rails 204; these features may provide pre-set hardware position points (e.g., pre-drilled holes) or allow for infinite positioning of hardware locations (e.g., grooves or t-slots).

For purposes of discussion, reference to the longitudinal direction or axis of a mounting rail refers to the direction or axis aligned with the substantially longer dimension of the mounting rail. As illustrated in FIG. 2A, reference to the transverse direction or axis of a mounting rail refers to the direction or axis of the mounting rail perpendicular to the longitudinal direction or axis of the mounting rail and parallel to the face of the mounting rail facing the back face of a mounted module (or simply parallel to the back face of a mounted module in the event that there is no appropriate face of the mounting rail).

Frameless photovoltaic modules mounted to rail mounting systems may experience sagging in areas not directly supported by a mounting rail due to the modules' weight and geometry. In a two-rail mounting system, a frameless photovoltaic module will typically only be externally supported at the two rail locations. At the two rail locations, the frameless photovoltaic module may rest on the rails themselves, which are typically far stiffer than the module and provide external support to the module along contact patches where the module rests on the rails. In areas where the frameless photovoltaic module does not receive external support, the module must be self-supporting, i.e., the module must rely on the material properties and geometry of the module for support.

Due to the nature of the external support provided by rail systems, a frameless photovoltaic module may experience longitudinal sag in the portion of the module between the rails and in the portions of the module cantilevered beyond the rails, i.e., unsupported regions of the module.

The frameless photovoltaic module may also flex such that the module is supported only along the edges of each mounting rail. In such cases, because the module weight may be distributed over a smaller area, i.e., along the edges of the mounting rail rather than over the surface of the mounting rail between the edges of the mounting rail, there may be increased stress at the mounting rail/module interface and increased overall displacement of the module.

Two-rail mounting rail systems are typically spaced according to the L/4 rule, in which the midpoints of the rails are typically positioned at a distance of L/4 from the transverse edges of a module, where L refers to the length of the module. For example, for a 1611 mm×665 mm module, the L/4 distance would be 402.75 mm.

In one embodiment, the transverse midpoint of each rail in a two-rail mounting rail system is instead positioned approximately 22% of the length of the module from the transverse edges of the module. Thus, for a 1611 mm×665 mm module, the midpoints of the mounting rails would be positioned about 354.4 mm from either transverse edge along the longitudinal axis.

More particularly, in a specific embodiment, the midpoint of each mounting rail in a two-rail mounting system may be positioned approximately 22.3% of the length of the module from a transverse edge of the module. In this embodiment, 55.4% of the module would thus be located between the midpoints of the two mounting rails.

Moreover, while the foregoing description contemplates a mounting configuration in which the clamps and rails are aligned, so that the rail spacing and clamp spacing would be the same, configurations in which the clamps and rails are not aligned are also possible and contemplated as embodiments of the invention. For example, the clamps may be attached to the rails via adaptor brackets, thereby offsetting the overlying clamps from the rails. In such a case, it is the clamps that should be spaced as described above (e.g., the clamps (rather than the rails) positioned approximately 22% of the length of the module from the transverse edges of the module). This configuration may be encountered, for example, in a retrofit of an existing two-rail solar module mounting rail system where adapters are connected to L/4 spaced rails to achieve clamp spacing approximately 22% of the length of the module from the transverse edges of the module, as described above.

Interface Strips

Figure 3A:
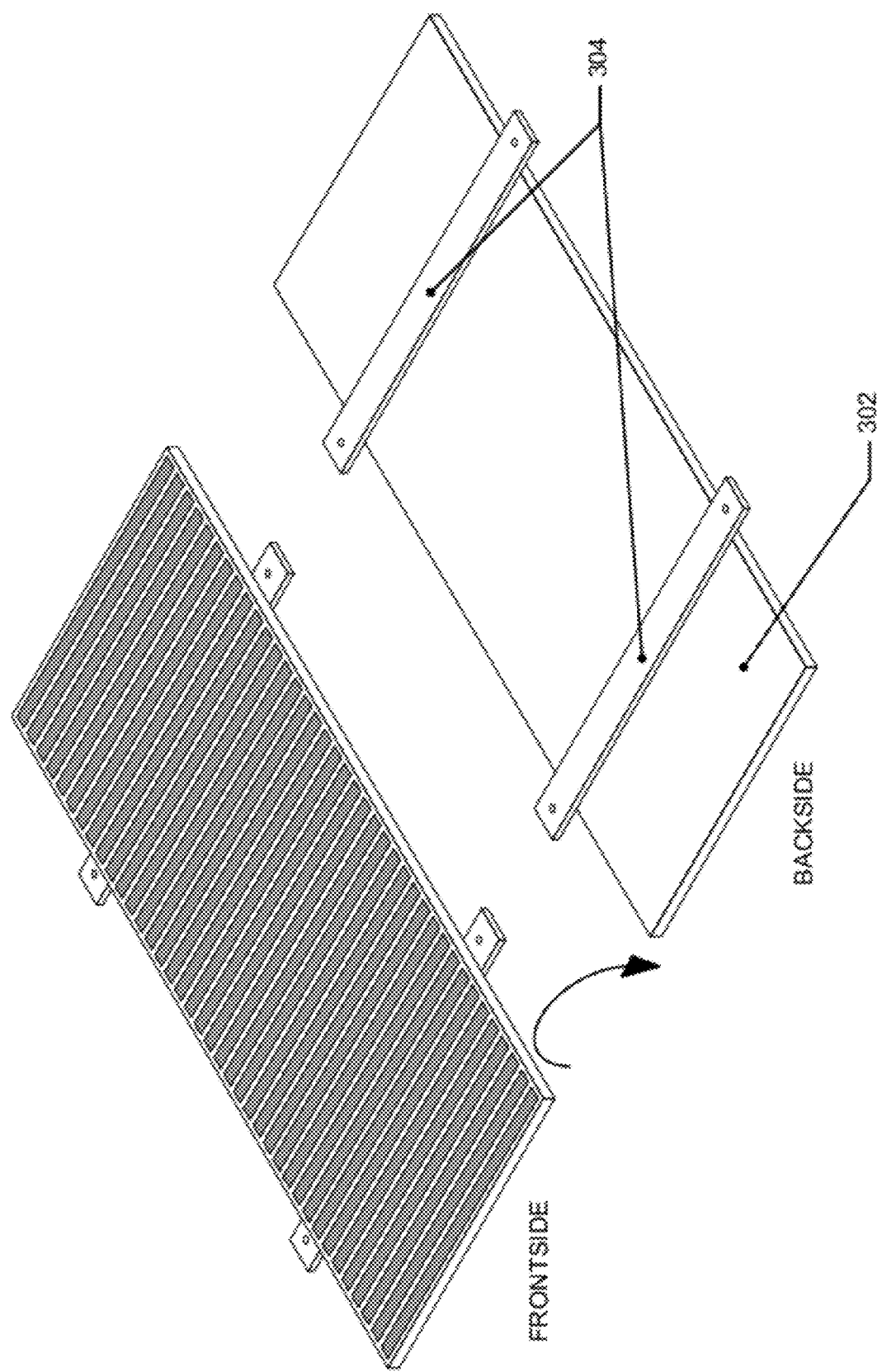
FIG. 3A is an isometric view of the front and back side of a representative frameless photovoltaic module and installed interface strips.

Frameless photovoltaic module 302 may be attached to mounting rail 306 using interface strip 304. Interface strip 304 may comprise a strip of material with a length substantially matching the transverse width of module 302. In an alternate embodiment, interface strip 304 may comprise a strip of material with a length exceeding the transverse width of module 302 such that, when mounted transversely to module 302, interface strip 304 may extend beyond the longitudinal edges of module 302. Interface strip 304 may be mounted to the backside sheet of module 302 or incorporated within the structure of module 302, as shown in FIG. 3A.

Interface strip 304 may include features for mounting interface strip 304 to mounting rail 306. For example, interface strip 304 may extend beyond the longitudinal edges of module 302 and include hole features 330 sized to accommodate fastening hardware 314, such as bolts or screws, as shown in FIG. 3B. Interface strip 304 may include several hole features 330 in each mounting location to allow for a range of different mounting rail 306 spacings. Alternatively, interface strip 304 may, in place of or in addition to hole features 330, include slot features 332 to allow for infinite adjustment of interface strip 304 relative to mounting rail 306, as shown in FIG. 3C.

Interface strip 304 may include features designed to interface with mounting hardware, such as bolt 314 and t-slot nut 315. Mounting hardware may also include other forms of fasteners, such as a carriage bolt, which is captured within a mounting rail channel, and a matching nut.

Interface strip 304 may include snap-in features allowing for toolless installation. Such snap-in features may include barbed cross-sections, light press fits, expanding fasteners, twist-lock fasteners, spring-loaded fasteners, or other suitable hardware. Interface strip 304 may also be configured to positively capture, or be positively captured by, mounting rail 306. For example, interface strip 304 may include constant-width slots with one end of the slot featuring a larger-dimension hole to allow the slot to be placed over a flanged post, where the flange of the flanged post is a larger dimension than the constant-width slot. Alternatively, interface strip 304 may be slid in a direction transverse to module 302 along the length of mounting rail 306 until module 302 is in the proper mounting rail location. Interface strip 304 may be a single material or an assembly of different materials. For example, interface strip 304 may comprise an extruded aluminum channel. Alternatively, interface strip 304 may comprise a layered composite. In yet a further embodiment, interface strip 304 may comprise a metal substrate overlaid with a layered composite.

Figure 3D:
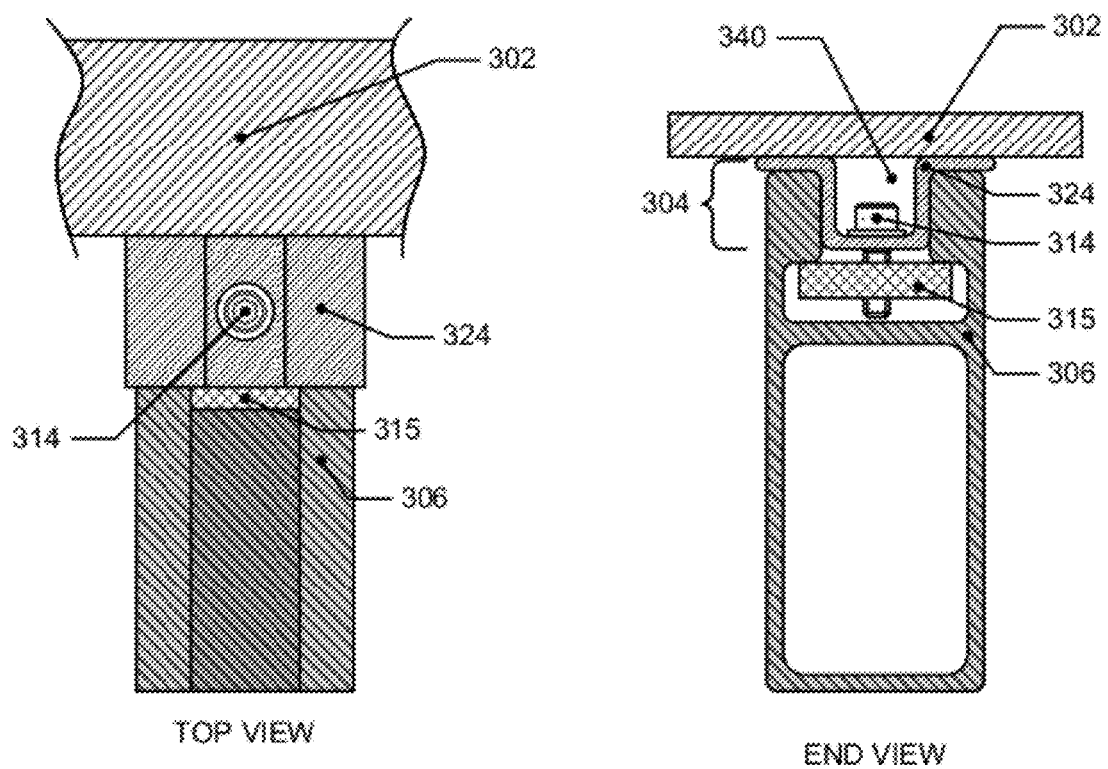

Interface strip 304 may be constant in cross-section along its length or possess a variable cross-section. Interface strip 304 may also incorporate any of a variety of different cross-sections, including solid-core, hollow-core, L-shaped, and open-channel cross-sections. For example, interface strip 304 may include rectangular cross-section 320. Alternatively, interface strip 304 may consist of a hollow, thin-wall, rectangular cross-section 322. Interface strip 304 may, in another embodiment, feature a flanged channel cross-section 324, as shown in FIG. 3D.

Figure 3E:
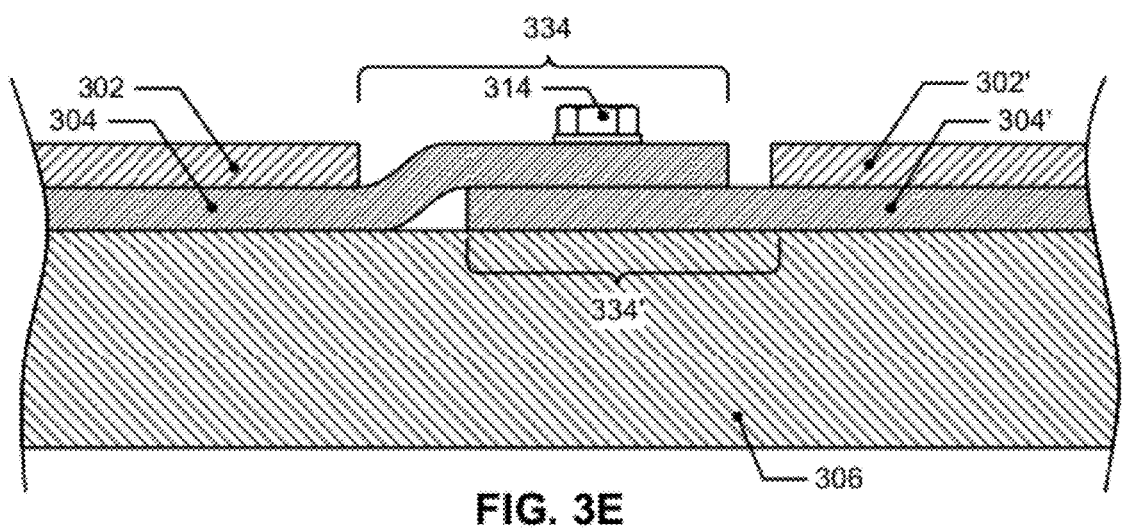
FIG. 3E is a side view of a representative lapped interface strip joint between two frameless photovoltaic modules in accordance with an embodiment of the present invention.

Interface strip 304 may be designed to interface with a neighboring interface strip 304' such that a single fastener 314 may be used to attach both interface strip 304 and 304' to mounting rail 306, as shown in FIG. 3E. For example, interface strip 304 may have solid rectangular cross-section 320 and may be configured with a jog at jogged end 334 such that the cross-section of jogged end 334 is offset through the thickness of interface strip 304 by the thickness of interface strip 304. This allows jogged end 334 of interface strip 304 and unjogged end 334' of interface strip 304' to form a lap joint, as shown in FIG. 3E. For such mounting configurations, each interface strip 304 is preferably manufactured with one jogged end 334 and one unjogged end 334', although interface strip 304 with two jogged ends may also be manufactured. An interface strip 304 with two jogged ends 334 would be matched with interface strips 304 with unjogged ends 334'. In situations where jogged end 334 of interface strip 304 is mounted to mounting rail 306 without forming a lap joint with unjogged end 334' of adjoining interface strip 304', a spacer of the same thickness as unjogged end 334' of interface strip 304' may be inserted between jogged end 334 of interface strip 304 and mounting rail 306 to prevent cantilevered loading of jogged end 334 of interface strip 304.

Interface strip 304 may be attached to module 302 through the use of adhesives, adhesive tape, diffusion bonding, or may even be sandwiched between layers of module 302 during module assembly. For example, if the backsheet of module 302 comprises 4 layers of woven composite, interface strip 304 may be installed between the layup of the inner two layers and the outer two layers.

In some embodiments, interface strip 304 forms channel or tunnel 340 across the transverse axis of module 302. Interface strip 304 may also be used to provide protection to electronics contained within module 302. For example, module 302 may include numerous diodes which are used to prevent backflow of generated electricity into module photovoltaic cells which are not operating at peak efficiency (such as those which may be temporarily in the shade). Such diodes may be located on the back side of module photovoltaic cells and may experience damage if not adequately protected. The locations of interface strip 304 and the diodes may be coordinated such that interface strip 304 protects the diodes.

Interface Strip Mounting without Mounting Rails Parallel to Interface Strip

Figure 2C:
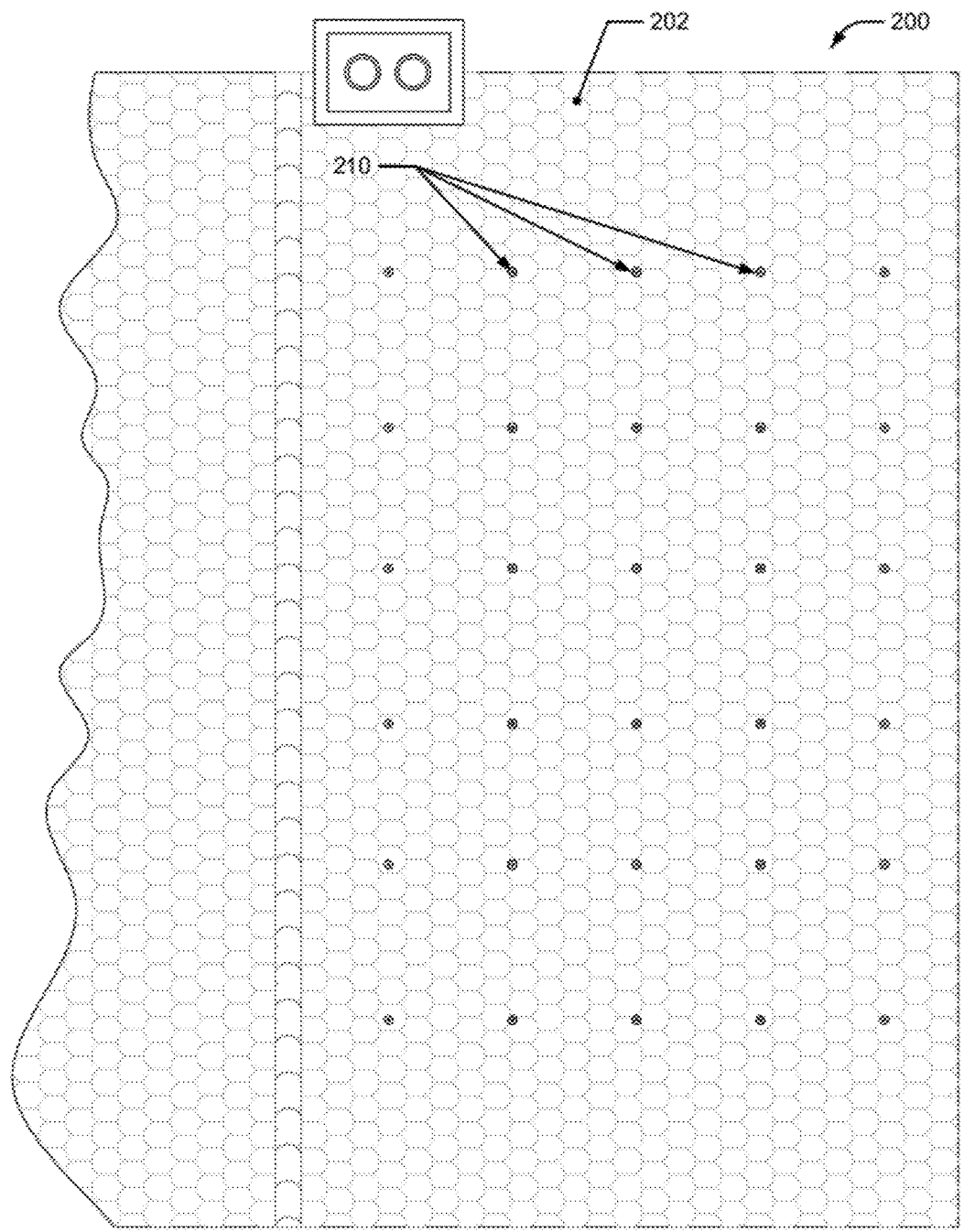
FIG. 2C depicts a partial plan view of an example household roof with rail-less module standoffs installed.

While the use of interface strips on modules has been described in the context of mounting modules to mounting rails in the above discussions, the use of interface strip-equipped modules may also allow for module mounting without mounting rails. FIG. 2C (prior to installation of modules) and FIG. 2D (after installation of modules) illustrate an example rail-less module 208 installation with interface strips 212. In some embodiments, interface strip 212 may provide sufficient support to module 208 without the need for support from a mounting rail. For such embodiments, interface strip 212 may simply be attached to module standoffs 210 on the support structure. For example, module standoffs 210 may be mounted directly to a roof 202 and module 208 with interface strips 212 may be installed directly onto module standoffs 210. This eliminates the need for mounting rails to be pre-installed and trued and also eliminates the weight and cost of the mounting rails and any clamping hardware that might otherwise be used.

Figure 2D:
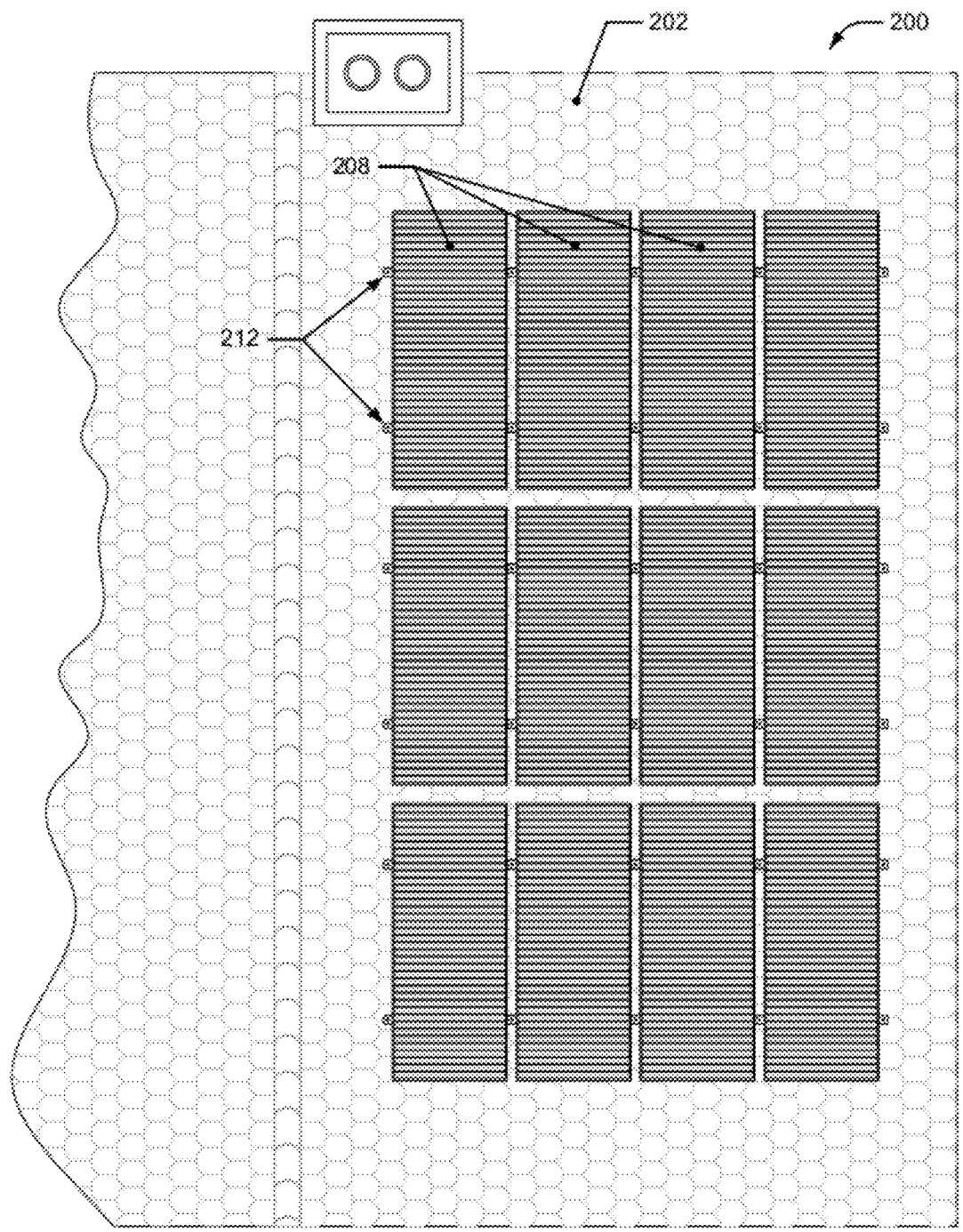
FIG. 2D depicts a partial plan view of an example frameless photovoltaic module installation on a household roof with module standoffs installed.

FIG. 2D depicts modules 208 installed such that interface strips 212 for each module 208 overlap the interface strips of adjoining module 208, such as described above and in FIG. 3E, although FIG. 3E depicts such a lap joint in the context of a rectangular cross-section interface strip and a mounting configuration using a mounting rail. FIG. 2D, by contrast, depicts a mounting configuration using no mounting rails and wherein the modules 208 are instead fastened directly to module standoffs 210. Interface strips 212 may, of course, use a cross-section other than the rectangular cross-section depicted in FIG. 3E.

Modules 208 may alternatively be installed on mounting rails which run perpendicular to interface strips 212. For example, modules 208 may be hung on a free-standing scaffold which features horizontal mounting rails spaced at the same spacing as discussed above. Modules 208 may be hung from the horizontal mounting rails such that the interface strips are oriented orthogonally to the horizontal mounting rails.

Installation of Interface Strips

Interface strips may be attached to modules at several points in time. During manufacture of the module, an interface strip may be woven into a composite forming the backsheet. Such installation would need to be done at the module manufacturing site due to the integrated nature of the interface strip installation.

An alternative is to glue the interface strips to the module backsheet. For example, interface strips might be attached to the module backsheet using a silicone adhesive. One suitable example is Dow-Corning PV804™ silicone, which is marketed for use with solar power systems. Suitable adhesives are UV-stable and weatherable, i.e., resistant to degradation in extremes of heat, cold, UV exposure, rain, snow and humidity expected to be encountered during its operation.

Alternatively, an adhesive tape, such as 3M acrylic VHB™ may be used to attach the interface strip to the module. Adhesive tape may be preferable to liquid adhesive due to the relatively instantaneous bond that forms. Such post-module-manufacture installation may be performed at the module manufacturing facility or at a secondary facility. The interface strip bonding may be performed in controlled conditions to maximize bond strength and quality.

Finally, interface strips may be attached to the module backsheet at a remote location, such as a solar panel installation jobsite. For example, interface strips may be attached to modules using silicone, as discussed above, but in the field instead of in the factory. However, installation in a controlled environment is preferred for quality control purposes. For example, field installation runs an increased risk of dirt and other contaminants being trapped between the interface strip and the module. Such foreign substances may cause a substandard adhesive bond, generate stress concentrations, or become a source for abrasion of the module. Installation in a controlled environment may also allow for any curing process which may be required to be accelerated or kept within required environmental conditions.

Regardless of where attachment of the interface strips to the module is performed, care must be taken to ensure that the mounting features of the interface strips are located in the correct locations relative to the module itself. To this end, a jig or other assembly fixture may be used to ensure that the interface strips are correctly situated relative to the module. Such a jig may allow for the fixturing of multiple modules and interface strips at once. For example, the jig may comprise a flat work surface with locator pins defining the boundaries of the module. Further locator pins may be used to define mounting hole locations of the interface strips to be installed. The locator pins may be of sufficient height that multiple modules and interface strips may be layered, one on top of the other, using the locator pins. This may be advantageous since the interface strips and modules may need to be fixtured during the curing process, which may take some time.

Example Modeling

Modeling was conducted in order to demonstrate the advantages provided by various aspects of this invention with regard to the positioning of the mounting rails. The data presented here are intended to better illustrate the invention as described herein and are non-limiting. The analyses shown reflect module mounting on a rigid rail mounting system, but the analysis results may be generally extrapolated to interface strip spacing and mounting as well.

Figure 4A:
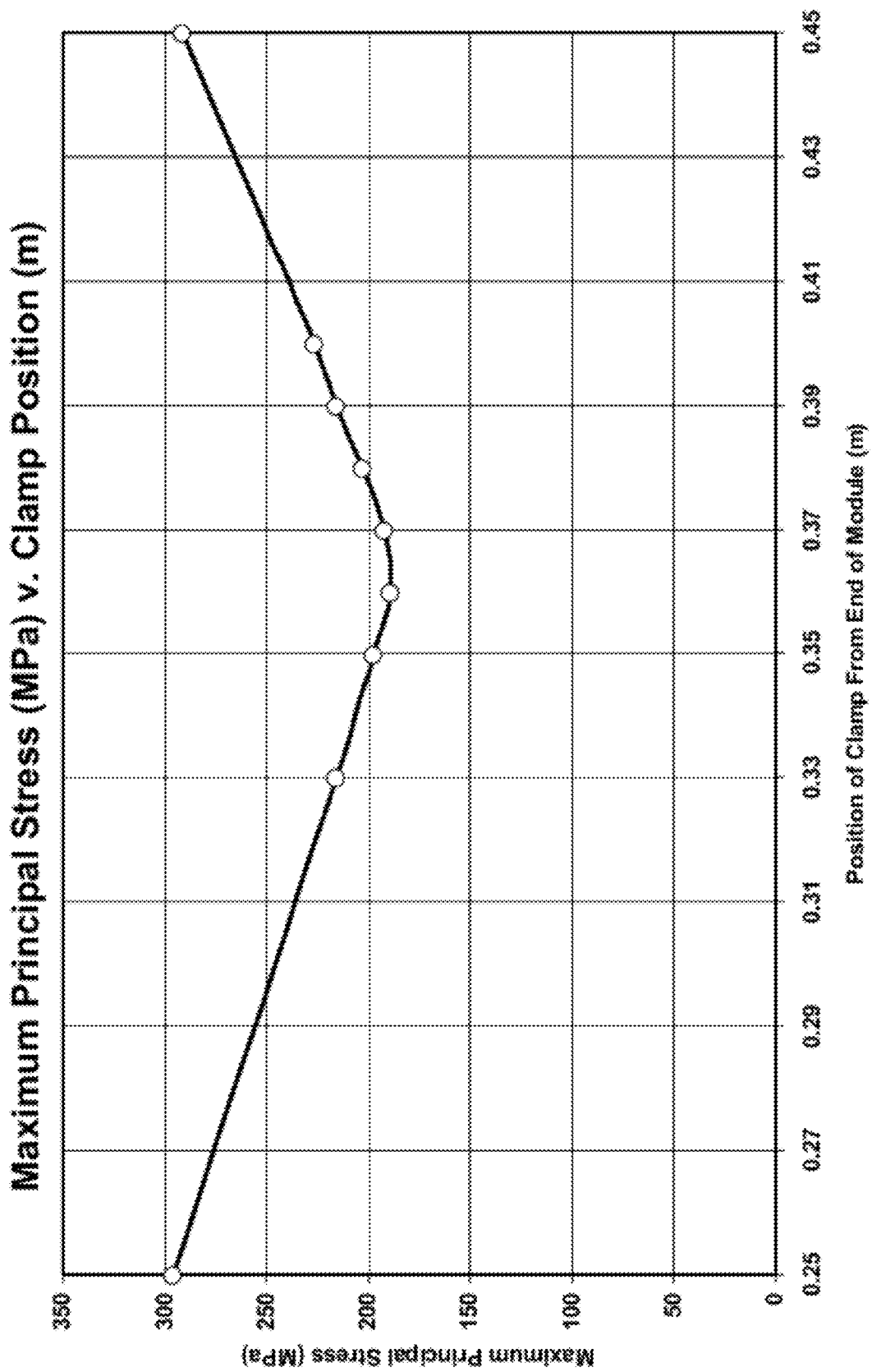
FIG. 4A is a plot of maximum principal stress versus clamp position in a representative module.

FIG. 4A depicts a plot of the maximum principal stress experienced by a typical module depending on the distance the clamps are from the transverse edge of the module. For the analyzed module, positioning mounting rails at approximately 22% of the longitudinal length of the module from either transverse edge reduced the resulting maximum principal stress by approximately 37 MPa relative to the stress induced by a L/4 rail spacing.

Figure 4B:
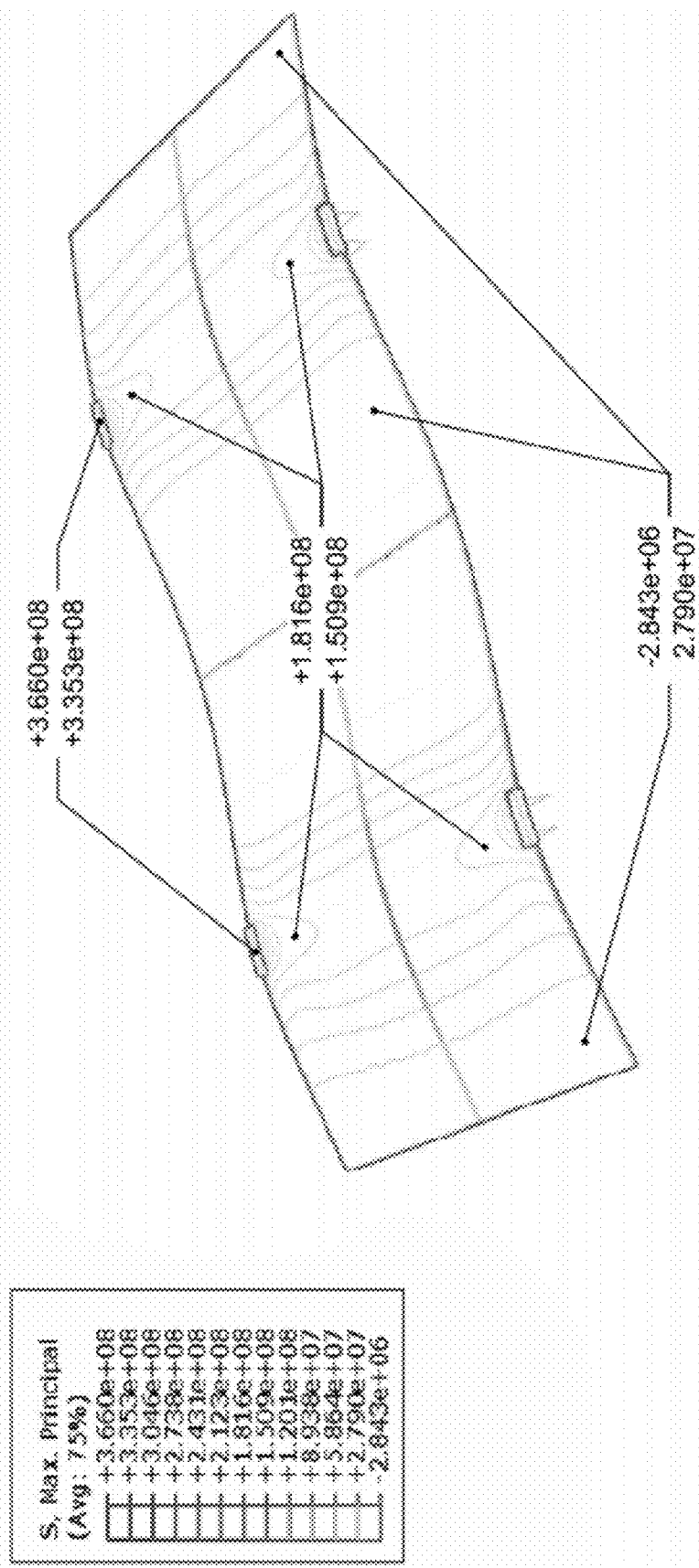
FIG. 4B is a stress contour plot of a representative module and clamping arrangement.

FIG. 4B is a stress contour plot of an example frameless photovoltaic module supported by two mounting rails, each rail attached to the module via two edge clamps. The rail spacing in this plot is approximately 22% of the module longitudinal length from either transverse edge. The combination of sag loading and localized stress concentrations in the regions of the edge clamps results in a peak principal stress of 366 MPa.

Example Installation Process

Figure 5:
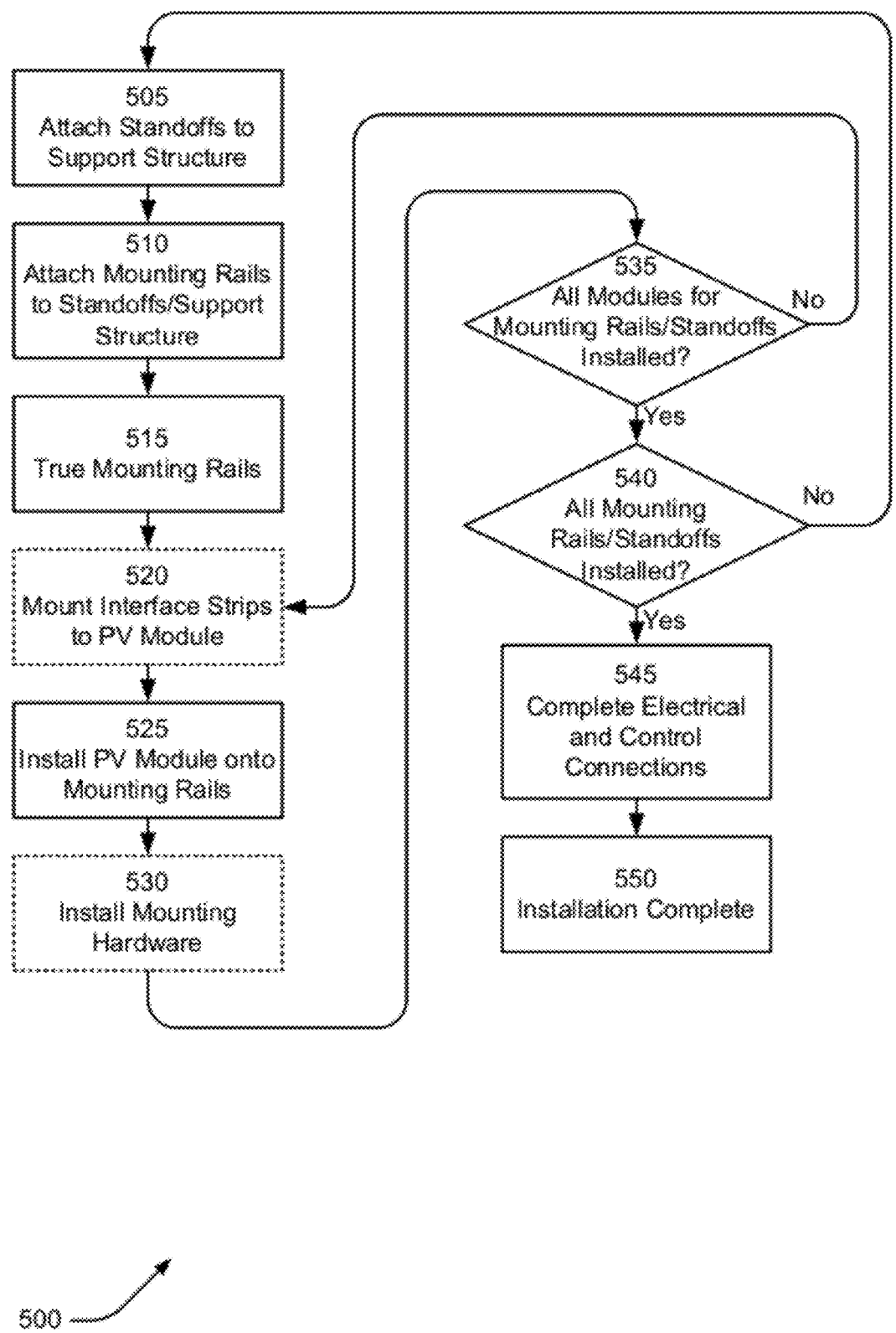
FIG. 5 is a flow diagram for a frameless photovoltaic module installation process in accordance with an embodiment of the invention utilizing the methods and equipment discussed in this application.

An example installation process utilizing mounting rail systems in conjunction with interface-strip equipped modules is diagrammed in FIG. 5. It should be noted that not all of the operations depicted and described are necessarily part of a process in accordance with the present invention; an installation process in accordance with the invention may include all or just some of the operations described. A number of the operations are provided for context to facilitate description and understanding of the invention, but are optional in some embodiments.

Installation process 500 begins with the installation of standoffs onto a support structure, as shown in step 505. This may include attaching one or more standoffs to a roof, carport, or other support structure. If mounting rails are to be used in the installation, the standoffs should be selected for compatibility with the mounting rails. If mounting rails are to be used and will be mounted directly to the support structure without standoffs, step 505 may be skipped. If mounting rails are not be used at all, standoffs may be selected for compatibility with module interface strip hardware. In the case of a pre-existing mounting rail or standoff installation, such as in a retrofit, re-installation of the mounting rails or standoffs may not be necessary if the rail spacing or standoff spacing is compatible with the interface strip mounting requirements.

In step 510, the mounting rails may be installed onto the standoffs. If mounting rails are not to be used in this installation, step 510 may be skipped. If mounting rails are to be mounted directly to the support structure, the mounting rails should be installed to the support structure rather than to standoffs.

In step 515, the mounting rails may be trued to remove any gross variation in mounting rail parallelism and levelness.

In step 520, interface strips may be installed onto the modules. If the interface strips have been pre-installed, such as before leaving the manufacturing plant, step 520 may be skipped. As mentioned above, field installation of the interface strips may involve the use of a fixturing jig to ensure proper alignment and placement of the interface strips. Such jigging or fixturing is also performed in step 520.

In step 525, a module is installed into the mounted clamps. Installing a module may involve placing the interface strips on top of mounting rails. Installing a module may also or alternatively involve placing mounting features of the interface strips, such as holes or slots, over matching features on the mounting rails or standoffs. For example, module installation may involve placing the holes on the interface strips over raised threaded studs protruding from multiple standoffs and lowering the module until it rests on a shoulder of the standoff. If a lap joint is to be formed between adjacent modules, the module should be properly oriented such that the lap joint is properly configured.

In step 530, the mounting hardware is installed. This may include threading nuts or other threaded fasteners onto threaded studs to secure the interface strips to standoffs. It may, if mounting rails are used, involve adjusting sliding captured mounting rail hardware, such as a T-slot nut, in the mounting rails and installing bolts or other threaded fasteners. It may involve engaging snap-in hardware that is pre-mounted in the interface strip or installing and engaging snap-in hardware that is not pre-mounted.

In step 535, the installation process returns to step 520 if any modules remain which will be installed on the installed mounting rails or standoffs.

In step 540, the installation process returns to step 505 if there are any mounting rails or standoffs remaining to be installed.

In step 545, electrical and control connections are made to the mounted modules, and any support electronics are installed and configured. In step 550, the mechanical installation is complete.

Of course, the above steps are merely examples of an installation process using the described technology. The ordering of the steps may be changed significantly—for example, it is not necessary to install the modules for one set of rails before installing a second set of rails. The order set forth in FIG. 5 should not be construed as limiting in any way.

CONCLUSION

Although the foregoing invention has been described in some detail for purposes of clarity of understanding, it will be apparent that certain changes and modifications may be practiced within the scope of the invention. It should be noted that there are many alternative ways of implementing both the processes and apparatuses of the present invention. Accordingly, the present embodiments are to be considered as illustrative and not restrictive, and the invention is not to be limited to the details given herein.

What is claimed is:

1. A photovoltaic module assembly, comprising: a frameless photovoltaic module comprising a frontside sheet and a backside sheet, the module having a length corresponding to a longitudinal direction and a width corresponding to a transverse direction; and a module attachment structure consisting of two interface strips, each interface, strip consisting of a rigid material longer than the module width, having a solid-core rectangular cross-section, wherein each interface strip is sandwiched between inner and outer layers of the backside sheet, each interface strip having extension portions, the extension portions extending beyond longitudinal edges of the module, each extension portion having an attachment feature to accommodate fastening hardware, the attachment feature selected from the group consisting of a hole and a slot; and whereby the attachment features provide for fastening of the module assembly to a module mounting structure via the interface strips.

2. The photovoltaic assembly of claim 1, wherein each interface strip is configured to interface with a neighboring module interface strip such that a single fastener may be used to attach both modules to a module mounting structure via their attached interface strips.

3. The photovoltaic module assembly of claim 1, wherein each interface strip rigid material is selected from the group consisting of metal, plastic, composite, and combinations thereof.

4. The photovoltaic module assembly of claim 1, wherein the backsheet comprises four layers of woven composite, and the interface strip is installed between a layup of two inner layers and two outer layers.

5. The photovoltaic module assembly of claim 1, wherein the two interface strips are positioned about 22% of the module length from each end of the module.

6. The photovoltaic module assembly of claim 1, wherein the frontside sheet is a glass sheet.

7. The photovoltaic module assembly of claim 6, wherein the backside sheet comprises glass.

8. The photovoltaic module assembly of claim 6, wherein the backside sheet is a non-glass flexible sheet.

9. The photovoltaic module assembly of claim 8, wherein the backside sheet comprises one or more materials selected from the group consisting of a polyethylene terephthalate, a polypropylene, a polybutylene, and a polybutylene terephthalate.

10. The photovoltaic assembly of claim 1, wherein the frameless photovoltaic module comprises a plurality of interconnected copper indium gallium selenide (CIGS) cells.

11. A method of making a photovoltaic assembly, the method comprising:
providing a frameless photovoltaic module assembly comprising a frameless photovoltaic module having a frontside sheet and a backside sheet, the module having a length corresponding to a longitudinal direction and a width corresponding to a transverse direction, and a module attachment structure consisting of two interface strips, each interface strip consisting of a rigid material longer than the module width, having a solid-core rectangular cross-section, wherein each interface strip is sandwiched between inner and outer layers of the backside sheet each interface strip having extension portions, the extension portions extending beyond longitudinal edges of the module, each extension portion having an attachment feature to accommodate fastening hardware, the attachment feature selected from the group consisting of a hole and a slot; and attaching the module assembly to a module mounting structure via fastening hardware in the attachment features in the interface strips.

12. The method of claim 11, wherein the fastening hardware comprises threaded fasteners selected from the group consisting of screws, and nuts and bolts.

13. The method of claim 12, wherein each interface strip extension portion attachment feature is a hole.

14. The method of claim 13, wherein the fastening hardware comprises a nut and bolt pair for each hole.

15. The method of claim 11, wherein each interface strip is configured to interface with a neighboring module interface strip such that a single fastener may be used to attach both modules to a module mounting structure via their attached interface strips.

16. The method of claim 11, wherein the backsheet comprises four layers of woven composite, and the interface strip is installed between a layup of two inner layers and two outer layers.

17. The method of claim 11, wherein the two interface strips are positioned about 22% of the module length from each end of the module.

18. A photovoltaic assembly, comprising: a photovoltaic module mounting structure; a frameless photovoltaic module comprising a frontside sheet and a backside sheet, the module having a length corresponding to a longitudinal direction and a width corresponding to a transverse direction; a module attachment structure consisting of two interface strips, each an interface strip consisting of a rigid material longer than the module width, having a solid-core rectangular cross-section, wherein each interface strip is sandwiched between inner and outer layers of the backside sheet, each interface strip having extension portions, the extension portions extending beyond longitudinal edges of the module, each extension portion having an attachment feature to accommodate fastening hardware, the attachment feature selected from the group consisting of a hole and a slot; and fastening hardware in the attachment features in the interface strips, the fastening hardware securing the module assembly to the module mounting structure.

19. The photovoltaic assembly of claim 18, wherein the photovoltaic module mounting structure further comprises module mounting rails that are substantially parallel to the interface strips.

20. The photovoltaic assembly of claim 19, wherein the interface strips are attached to the module mounting rails of the module mounting structure.

21. The photovoltaic assembly of claim 18, wherein the photovoltaic module mounting structure further comprises module mounting rails that are substantially orthogonal to the interface strips.

22. The photovoltaic assembly of claim 18, wherein the fastening hardware comprises threaded fasteners selected from the group consisting of screws, and nuts and bolts.

23. The photovoltaic assembly of claim 22, wherein each interface strip extension portion attachment feature is a hole.

24. The photovoltaic assembly of claim 22, wherein the fastening hardware comprises a nut and bolt pair for each hole.

25. The photovoltaic assembly of claim 18, wherein each interface strip is configured to interface with a neighboring module interface strip and a single fastener is used to attach both modules to a module mounting structure via their attached interface strips.

26. The photovoltaic module assembly of claim 25, wherein the extension portion of each interface strip is offset towards the frontside sheet of the module by the thickness of the interface strip.

27. The photovoltaic assembly of claim 18, wherein the module mounting structure comprises a rail-less array of module standoffs configured for attachment to the interface strips.

28. The photovoltaic assembly of claim 18, wherein the backsheet comprises four layers of woven composite, and the interface strip is installed between a layup of two inner layers and two outer layers.

29. The photovoltaic assembly of claim 18, wherein the two interface strips are positioned about 22% of the module length from each end of the module.

30. The photovoltaic assembly of claim 18, wherein the backside sheet is a non-glass flexible sheet.

31. The photovoltaic assembly of claim 18, wherein the frameless photovoltaic module comprises a plurality of interconnected copper indium gallium selenide (CIGS) cells.

32. The photovoltaic module assembly of claim 2, wherein a first solid rectangular cross-section extension portion of each interface strip is offset towards the frontside sheet of the module by the thickness of the interface strip.

33. The photovoltaic module assembly of claim 1, wherein the module includes diodes to prevent backflow of generated electricity into module photovoltaic cells which are not operating at peak efficiency, and the locations of the interface strip and the diodes are coordinated such that interface strip protects the diodes.

34. The method of claim 15, wherein the extension portion of each interface strip is offset towards the frontside sheet of the module by the thickness of the interface strip.

35. The method of claim 11, wherein the module includes diodes to prevent backflow of generated electricity into module photovoltaic cells which are not operating at peak efficiency, and the locations of the interface strip and the diodes are coordinated such that interface strip protects the diodes.

36. The photovoltaic assembly of claim 18, wherein the module includes diodes to prevent backflow of generated electricity into module photovoltaic cells which are not operating at peak efficiency, and the locations of the interface strip and the diodes are coordinated such that interface strip protects the diodes.

* * * * *